United States Patent [19]

Hardy

[11] 4,020,767

[45] May 3, 1977

[54] DISPLAY TURNTABLE FOR VEHICLES OF DIFFERENT WHEEL BASES

[75] Inventor: David Hardy, Bolton, England

[73] Assignee: British Turntable Company, Limited, Bolton, England

[22] Filed: Apr. 21, 1975

[21] Appl. No.: 570,030

[30] Foreign Application Priority Data

Apr. 26, 1974 United Kingdom ............ 18355/74

[52] U.S. Cl. .................................. 104/35; 104/44; 308/3 R
[51] Int. Cl.² ........................................ B60S 13/02
[58] Field of Search ............ 104/44, 35, 99, 215 C, 104/45, 46, 47; 403/104, 109; 40/33, 68; 105/27 R, 177; 308/3 R; 214/16.1 CB

[56] References Cited

UNITED STATES PATENTS

| 963,346 | 7/1910 | Wilt | 403/109 |
|---|---|---|---|
| 2,915,327 | 12/1959 | Kreske | 403/104 |
| 2,961,260 | 11/1960 | Newlin | 403/104 |
| 3,420,187 | 1/1969 | Johnson et al. | 104/44 X |

FOREIGN PATENTS OR APPLICATIONS 825,493 1/1952 Germany ............................ 104/44

Primary Examiner—Robert J. Spar
Assistant Examiner—J. Slattery
Attorney, Agent, or Firm—Harrington A. Lackey

[57] ABSTRACT

A display turntable for vehicles consists of a rotatable support unit having adjustable cradles telescopingly engaged therewith to accommodate vehicles of different wheel bases, there being wheel pad structures slidably engaged with the cradles for adjustment to accommodate vehicles of different track widths. In order to facilitate telescoping motion between the relatively movable parts, guide means are provided to maintain a requisite degree of alignment, whilst bearer plates are provided to support the slidable element clear of the bottom of the structure with which it is engaged.

9 Claims, 3 Drawing Figures

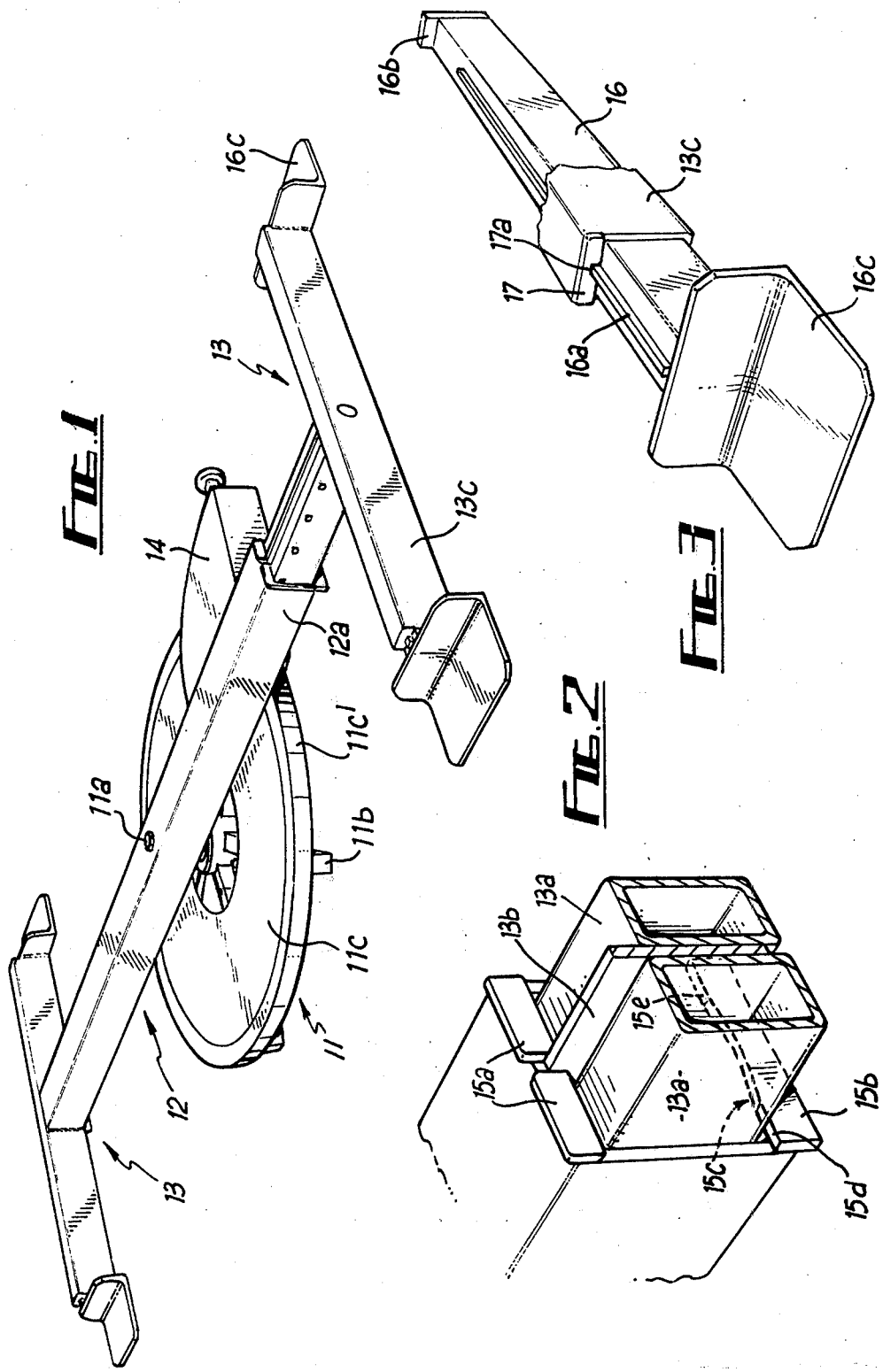

DISPLAY TURNTABLE FOR VEHICLES OF DIFFERENT WHEEL BASES

The invention concerns turntables and has more particular reference to display turntables of the kind used in vehicle showrooms and the like.

Vehicle display turntables are known which comprise a base unit upon which a central support unit is rotatably mounted, there being a drive means operable between the base unit and the central support unit to effect relative rotational motion therebetween. The support unit carries adjustable cradles which are movable longitudinally of the support unit to cater for vehicles of different wheel-base whilst the cradles support wheel pads provided at the ends of respective arms slidably engaged with the cradles and movable transversely of the unit, the adjustment facility of the arms providing for the application of the turntable to vehicles of different track widths.

In order to allow of the movement of the cradles relative to the support unit and of the support arms relative to the respective cradles suitable keys and key ways are provided on the parts between which relative motion is to be possible.

Whilst the conventional vehicle display turntables are effective in operation and have achieved widespread acceptance, their application is limited to the context of relatively small vehicles. In larger vehicles a more substantial structure would be required, and simply to scale up the existing arrangements to take the higher loads would be to provide a bulky and aesthetically unsatisfactory structure, and one which would have little, if any, commercial appeal.

The primary object of the present invention is to provide a vehicle display turntable of aesthetically pleasing effect which will be capable of use in the context of larger vehicles than is practical with conventional structures.

According to one aspect of the present invention, a display turntable comprising a base unit, a support unit rotatably carried by the said base unit, an adjustable cradle or cradles slidably mounted on the support unit for adjustment in a first direction and a wheel pad structure or structures mounted on the or on a respective cradle for adjustment transversely of the said one direction is characterized in that each cradle is telescopingly engaged with the support unit and/or each wheel pad structure is telescopingly engaged with its related cradle.

According to another aspect of the invention in a vehicle display turntable having a cradle or cradles slidably mounted in telescoping manner on a rotatable support unit we propose to provide guide means between the relatively adjustable parts for facilitating relative movement therebetween and a bearer plate to support the movable element, such bearer plate having spaced support surfaces for engagement with respective lateral regions of the element to be supported.

The invention will now be described further, by way of example only, with reference to the accompanying drawing illustrating one embodiment thereof and in which:

FIG. 1 is a perspective view of a vehicle display turntable constructed in accordance with the invention;

FIG. 2 is a perspective view of a part of the arrangement of FIG. 1, drawn to a larger scale, and shows the guide and support means for the cradle; and FIG. 3 is a perspective view of another part of the arrangement of FIG. 1, like-wise drawn to a larger scale, and shows the form taken by a wheel pad and wheel pad arm as telescopingly engaged with one end of the transverse element of a cradle.

Referring now to the drawing, and particularly to FIG. 1 thereof, a vehicle display turntable comprises a base unit 11 having an upstanding spindle 11a upon which a central support unit 12 is rotatably mounted, the said support unit comprising a tube 12a of rectangular section and having a respective cradle 13 telescopingly engaged with each of the opposite ends thereof.

A motor assembly, not shown, is mounted on the support unit and has a drive pulley thereof spring-loaded into frictional engagement with the periphery of the base unit in manner well known in the art, the motor assembly being disposed within a housing 14 secured to the said support unit. The motor assembly is connected with a suitable source of electrical power through the base unit in such manner, for example, as is disclosed in the specification of our prior British Pat. No. 1,155,944.

The base unit 11 comprises a spider having radial arms 11b through which any load applied to the turntable is evenly distributed and an annular cover 11c removably applied to the spider. The cover 11c has a depending flange 11c' about the periphery thereof with which the drive pulley aforesaid is in frictional engagement.

The central support unit 12 is arranged diametrically of the base unit for rotation about a vertical axis as defined by the spindle 11a and is mounted in offset disposition in the longitudinal direction of the tube 12a.

Each end of the tube 12a is provided with guide and support means for a respective cradle, such guide and support means being best shown in FIG. 2. Thus, referring now to FIG. 2, two spaced plates 15a are provided in depending disposition relative to the top of the open end of the tube, the said plates defining a space or slot therebetween and being secured to the tube, as by welding. A bearer plate 15b is secured across the bottom of the open end of the tube, such plate 15b having an upwardly facing bearer edge 15c, such edge having flat lateral portions 15d and an upwardly concave intermediate portion 15e. The plate 15b is firmly secured to the tube, as by welding.

Each cradle 13 is of generally T-shape when viewed in plan, the central limb of such cradle comprising two hollow section elements 13a arranged in adjacent side-by-side disposition with a plate 13b interposed therebetween, the longitudinal edge of the plate protruding from the said elements and being intended for engagement with the space between plates 15a when the cradle is telescopingly engaged with tube 12a. The extent to which the plate 13b protrudes beyond the hollow section elements varies according to the distance from the angle of the T-shaped cradle, being of reducing height towards such angle.

The transverse element 13c of the cradle is of hollow section and is secured to the end of the aforesaid central limb 13a, as by welding. A respective wheel pad arm 16 is telescopingly engaged with each end of the transverse element. Each end of the transverse element is provided with a detent plate 17 extending across the top of the opening in an analogous manner to the plates 15a, there being a slot 17a centrally of the lower edge of such plate. The element is also provided with a bearer plate, not shown, of a like kind to bearer plate 15b.

The wheel pad arm 16 is of hollow section and is of such transverse diameter as to be a free sliding fit within the transverse element 13c of the cradle, there being a rib 16a extending along the top of the arm for engagement with the slot 17a, the height of the rib varying in a similar manner to the reducing height of the edge of the plate 13b above the hollow section elements 13a. At its inner end the arm 16 carries an abutment 16b for co-operation with the back of the detent plate 17, thereby to limit motion of the arm outwardly of the transverse limb of the cradle, whilst at its outer end the arm 16 carries a wheel pad 16c.

In order to adjust the turntable so as to accommodate a particular vehicle for display purposes, the cradles 13 are shifted longitudinally of the tube 12a according to the wheelbase of the vehicle in question, and the wheel pad arms are moved inwardly or outwardly of the cradle to accommodate the track width of the vehicle.

The guide means defined by the upper edge of the plate 13b and the space between adjacent ends of the plates 15a, in the case of the cradle and tube, or by the rib 16a and the slot 17a, in the case of the wheel pad arms and the transverse elements of the cradle, together with the provision of bearer plates engageable with the underside of those elements 13a and 16 which slide within other elements 12a 13c, facilitates the sliding movement of the cradle 13 and of the wheel pad arms 16. In addition to facilitating adjustment, marking of and wear to the relatively movable parts is minimized.

The slight variation in the height of the plate 13b or of the rib 16a facilitates adjustment in that it permits of a lifting of the cradle 13 or wheel pad 16c prior to telescoping movement.

The guide and support means as herein disclosed do provide for the fabrication of the structure from commercially available tube components, thereby avoiding the need for expensive, accurately dimensioned components.

The invention is not restricted to the exact features of the embodiment described and illustrated, since alternatives will readily present themselves to one skilled in the art. Thus, although we prefer that the various elements be, where appropriate, of generally rectangular cross-section, other cross-sections may well be found to be of application. The guide means and bearer surfaces may be provided in a different form, if desired. For example, instead of providing an upstanding plate on the cradle (or wheel pad arm) for co-operation with a complementary slot on the tube end, a lug may be provided on the tube end for engagement with an elongate slot on the cradle (or wheel pad arm).

Whilst we provide bearer surfaces on the transverse elements 13c of the cradle of a like kind to those provided on the tube 12a, such surfaces may not be necessary in view of the lesser weight of the wheel pad arm 16 and the greater ease with which this can be adjusted than can the cradle 13.

What we claim is:

1. In a vehicle display turntable including a cradle having an elongated element slidably mounted in telescoping relationship with the elongated element of a rotatable support unit, and a plurality of wheel pad structures each having an arm member telescopingly engaged with the transverse element of a respective cradle, first guide means between and independently guiding said elongated elements to facilitate relative movement therebetween, second guide means between and independently guiding said arm members and said transverse element to facilitate relative movement therebetween, a bearer plate extending transversely between said elongated elements and beneath one of said elongated elements, said bearer plate having transversely spaced support surfaces slidably engaging transversely spaced regions of the bottom surface of said one elongated element.

2. The invention according to claim 1 in which said first guide means comprises a first detent plate structure having a slot therein mounted transversely on one of said elongated elements and a first elongated rib member mounted on the other of said elongated elements for longitudinal guiding movement through said slot.

3. The invention according to claim 1 in which said second guide means comprises a second detent plate structure for each arm member mounted on said transverse element transversely of the direction of relative movement between said arm members and said transverse element, each second detent plate structure having a slot therethrough, and a second elongated rib member mounted on each of said arm members for longitudinal guiding movement through a corresponding slot.

4. The invention according to claim 2 in which the height of said first rib member on said second elongated element decreases away from said first elongated element.

5. The invention according to claim 3 in which said second rib member is mounted on top of each arm member and decreases in height away from said transverse element.

6. A display turntable comprising:
   a. a base unit,
   b. a support unit rotatably carried by said base unit and having a first elongated element,
   c. at least one cradle having a second elongated element slidably mounted on said first elongated element for longitudinal telescopic adjustment relative to said support unit,
   d. said cradle having a transverse element,
   e. wheel pad structures having arm members slidably mounted in opposed disposition on said transverse element for transverse telescopic adjustment relative to said cradle,
   f. first guide means between and independently guiding said first and second elongated elements to facilitate relative movement between said cradle and said support unit,
   g. second guide means between and independently guiding said transverse element and said arm members to facilitate relative movement between said wheel pad structures and said cradle, and
   h. a bearer plate fixed to one of said elongated elements, said bearer plate having transversely spaced support surfaces below and slidably engaging transversely spaced lateral regions on the bottom of the other of said elongated elements, for supporting said other elongated element for telescoping slidable movement independent of said one elongated element.

7. The invention according to claim 6 in which said support surfaces are formed on a longitudinal edge of said bearer plate and are coplanar, an intermediate portion between said support surfaces having a surface concave upward opposing said other elongated element.

8. The invention according to claim 6 in which said second elongated element and said transverse element form a T-shaped cradle, said second elongated element comprising two parallel hollow elongated section elements arranged side-by-side.

9. The invention according to claim 8 in which said first guide means comprises a detent plate having a slot therein fixed transversely of said first elongated element above said second elongated element, an elongated rib member interposed between said hollow section elements and projecting above said hollow section elements for guiding reception through said slot.

* * * * *